United States Patent [19]

Sultan et al.

[11] Patent Number: 5,709,473
[45] Date of Patent: Jan. 20, 1998

[54] TEMPERATURE SENSOR

[75] Inventors: Michel Farid Sultan, Troy; Michael James O'Rourke, Warren, both of Mich.

[73] Assignee: General Motors Corporation, Detroit, Mich.

[21] Appl. No.: 645,312

[22] Filed: May 13, 1996

[51] Int. Cl.[6] ............................................. G01J 5/02
[52] U.S. Cl. ............................................. 374/131; 374/126
[58] Field of Search .............................. 374/2, 120, 121, 374/126, 127, 128, 130, 131, 161; 250/339.01, 339.04, 227.14; 356/43, 446, 448; 364/557

[56] References Cited

U.S. PATENT DOCUMENTS

| | | | |
|---|---|---|---|
| 4,081,215 | 3/1978 | Penney et al. | 374/127 |
| 4,765,752 | 8/1988 | Beynon et al. | 374/127 |
| 4,770,544 | 9/1988 | Mossey | 374/131 |
| 4,790,669 | 12/1988 | Christensen | 374/131 |
| 5,164,999 | 11/1992 | Shifflett | 374/131 |
| 5,191,206 | 3/1993 | Bolarski et al. | 250/277.14 |
| 5,277,496 | 1/1994 | Mayer et al. | 374/130 |
| 5,282,017 | 1/1994 | Kasindorf et al. | 374/126 |
| 5,364,186 | 11/1994 | Wang et al. | 374/131 |

FOREIGN PATENT DOCUMENTS 58-139038  8/1983  Japan ..................... 374/131

*Primary Examiner*—G. Bradley Bennett
*Attorney, Agent, or Firm*—Anthony Luke Simon

[57] ABSTRACT

A temperature sensor comprising: a wave guide with a cylindrical wall; a material of low emissivity included at the cylindrical wall for generating black body radiation into the wave guide, wherein at least a portion of the generated black body radiation is carried through the wave guide; a first sensor receiving the generated black body radiation and providing a first output signal indicative of a first magnitude of a first bandwidth of the generated black body radiation; and a second sensor receiving the generated black body radiation and providing a second output signal indicative of a second magnitude of a second bandwidth of the generated black body radiation, wherein a difference between the first and second output signals is a linearized indication of temperature of at least a portion of the wave guide.

8 Claims, 3 Drawing Sheets

TEMPERATURE SENSOR

This invention relates to a temperature sensor.

BACKGROUND OF THE INVENTION

One known method for determining the temperature of a high temperature environment includes using a black body to emit infrared electromagnetic radiation in response to the temperature of the environment to which the black body is exposed. The method includes using a detector for measuring the amount of radiation emitted by the black body and determines a temperature signal from the output of the detector.

Some such sensors include a flat black body emitting light into an optical fiber or a bundle of optical fibers that carries the emitted light to a sensor for analysis. Another example uses a hollow cylinder formed of silicon carbide or silicon nitride as the black body. Another example uses a sapphire rod coated with iridium, which acts as the black body.

SUMMARY OF THE PRESENT INVENTION

It is an object of the present invention to provide an improved temperature sensor.

Advantageously, this invention provides a temperature sensor suitable for use in a high temperature environment. Advantageously this invention provides a temperature sensor that monitors the temperature of an environment based on radiation from a black body exposed to that environment.

Advantageously, this invention makes use of a black body integrative wave guide to emit and integrate black body radiation in response to the temperature of the environment to which the black body is exposed.

Advantageously, this invention sets forth a unique approach to analyzing radiation from the black body integrative wave guide to provide a temperature signal that is linearized to the temperature range to which the black body integrative wave guide is exposed.

Advantageously, according to a preferred example, the emissive material used in the black body integrative wave guide has a low emissivity allowing the optical signal to be independent of the emissivity of the black body.

Advantageously, according to a preferred example of this invention, a temperature sensor is provided comprising a wave guide with a cylindrical wall, a material of low emissivity included at the cylindrical wall for generating black body radiation into the wave guide wherein at least a portion of the generated black body radiation is carried through the wave guide, a first sensor receiving the generated black body radiation and providing a first output signal indicative of a first magnitude of a first bandwidth of the generated black body radiation, and a second sensor receiving the generated black body radiation and providing a second output signal indicative of a second magnitude of a second bandwidth of the generated black body radiation, wherein a difference between the first and second output signals is a substantially linearized indication of temperature of at least a portion of the wave guide.

BRIEF DESCRIPTION OF THE DRAWINGS

The present invention will now be described by way of example with reference to the following drawings in which.

DETAILED DESCRIPTION OF THE INVENTION

Figure 1:
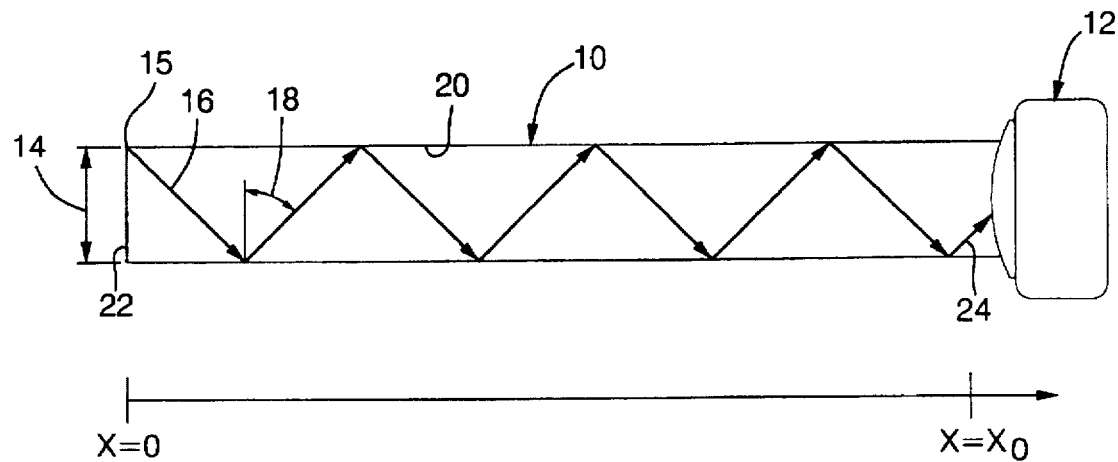
FIG. 1 illustrates an example black body integrative wave guide and radiation detector.

Referring now to FIG. 1, an example black body integrative wave guide 10 is shown in schematic as a hollow tube having a diameter 14 and a length between ends 22 and 24 represented by $X_0$. The wall 20 itself or a coating on the wall 20 acts as a black body that responds to the temperature of the wall 20 to emit infrared radiation that varies with the temperature of the wall 20 of the black body.

Reference 16 designates an example ray of black body radiation (infrared light) that is emitted from point 15 in the wave guide and travels at an angle $\theta$, represented by reference 18, of 45° with respect to both the end wall 22 and cylindrical wall 20. The ray 16 reflects from the internal surface of wall 20 at various points and joins with additional rays emitted from the wall 20 at the various points to exit the wave guide 10 at end 24. An infrared detector 12 receives the light from the end 24 and provides the light to a spectrum analyzer or other processor to analyze the behavior of the black body integrative wave guide 10.

It can be shown that the integrative wave guide in FIG. 1 has the following properties. First, for any specific emissivity of the black body material, the intensity of the signal output from the wave guide increases with wave guide length and reaches an upper limit when the length exceeds a specific threshold. Second, the threshold length above which the output intensity stabilizes increases with decreasing emissivity. Third, the maximum output intensity increases with decreasing emissivity. Fourth, the maximum output becomes independent of emissivity if the emissivity is small enough, for example, less than 0.2. This is explained as follows.

It can be shown that the output intensity of a given ray 16 from the wave guide 10 can be represented by the following equation:

$$D(\theta,\lambda,T) = (2\pi hc^2/\lambda^5)(1/(e^{hc/(\lambda kT)}-1))\,(\epsilon d \tan\theta/(\ln(1-\epsilon))) \\ (e^{(\ln(1-\epsilon))x_0/(d\tan\theta)} - 1),$$  Equation 1 where $D(\theta,\lambda,T)$ represents the output intensity of the ray traveling at angle $\theta$ and having a wavelength $\lambda$ at the temperature T through the wave guide, k is the Boltzman's constant, $\epsilon$ is the emissivity, h is Planck's constant, c is the speed of light, $x_0$ is the length of the wave guide and d is the diameter of the wave guide.

Assuming that the length $x_0$ is much greater than $-d\tan\theta/(\ln(1-\epsilon))$, then the equation for the output intensity becomes:

$$D(\theta,\lambda,T) = (2\pi hc^2/\lambda^5)(1/(e^{hc/(\lambda kT)}-1)) \\ (d\tan\theta/(-\epsilon/(\ln(1-\epsilon)))),$$  Equation 2 which no longer has a term dependent on length and thus the output intensity is independent of length. In a preferred example, for black bodies with emissivity 0.3 and below, the length $x_0$ is 40 or more times the diameter, d.

Further, if the emissivity is very small, the output intensity is represented by:

$$D(\theta,\lambda,T) \equiv (2\pi hc^2/\lambda^5)(1/(e^{hc/(\lambda kT)}-1))(d \tan \theta) \quad \text{Equation 3}$$

which has no term representative of emissivity and thus is independent not only of length but of emissivity of the black body material.

Figure 2:
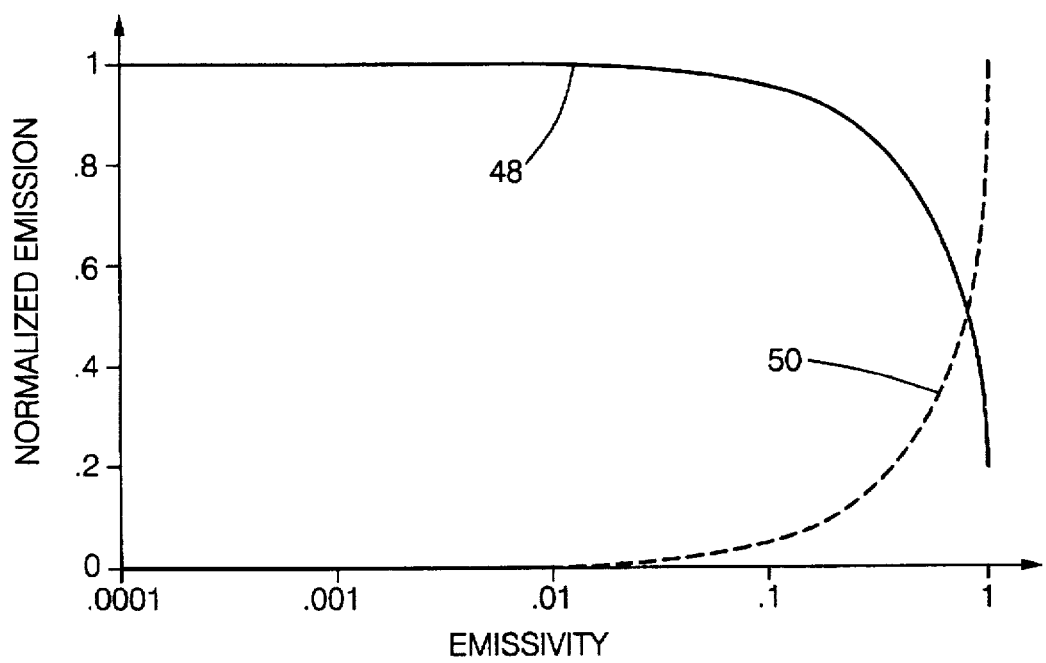
FIG. 2 is a graph comparing a black body integrative wave guide according to this invention and a conventional proportional black body.

The benefit of using an integrative wave guide with a black body emitter having low emissivity is shown in FIG. 2. The trace 48 graphs the intensity defined by the last part of Equation 2 versus emissivity. As can be seen, as emissivity decreases the normalized emission increases. Trace 48 contrasts to the response of conventional black body radiators used as proportional sensors, represented by reference 50 in which the normalized emission increases as emissivity increases. Thus, in the conventional proportional black body sensor, it is desirable to use a black body whose emissivity is equal to 1 or close thereto. In contrast, according to this invention, the black body has a low emissivity, preferably less than 0.3 and most preferably less than 0.2.

Figure 3:
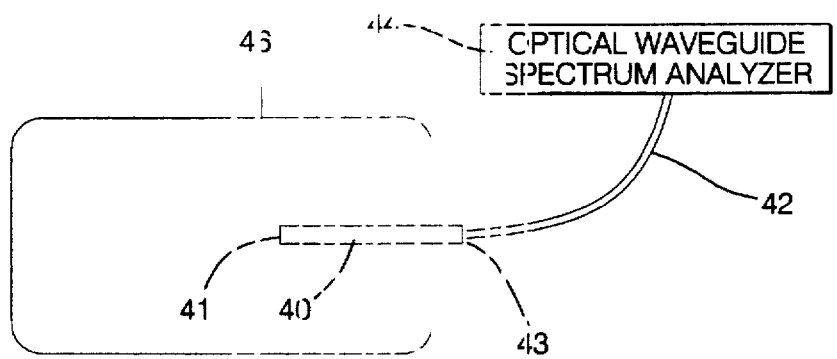
FIG. 3 illustrates an example mechanization for sensing temperature with a black body integrative wave guide.

Referring now to FIG. 3, an example arrangement for analyzing the performance of the wave guide according to this invention is shown. Reference 40 designates a black body integrative wave guide which, for example, is a 15 cm long hollow alumina tube with a 4 mm inner diameter. The alumina of the tube wall acts as the emissive material typically having an emissivity of 0.3 or less. The tube has a closed end 41 and an open end 43 where optical fiber 42 receives the radiation emitted by wave guide 40 and transmits the radiation within the fiber to optical wave guide spectrum analyzer 44, for example, Model 200, available from Guided Wave, Inc. The wave guide 40 is partially inserted into a high temperature medium, such as a furnace 46, and its radiation output is plotted by the optical wave guide spectrum analyzer 44, as shown in FIG. 4.

Figure 4:
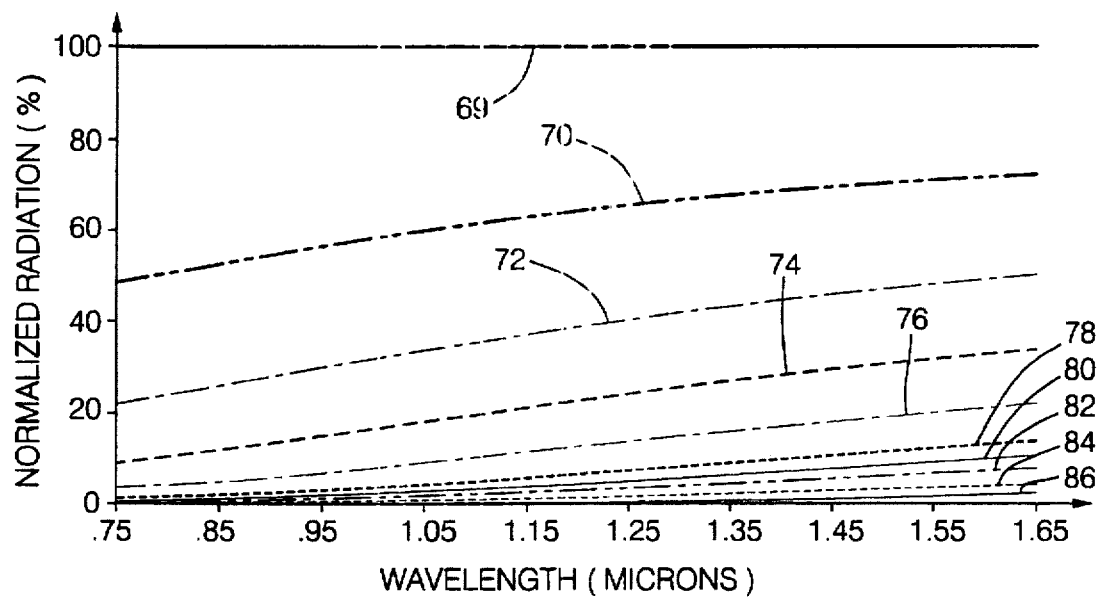
FIG. 4 illustrates example broad spectrum radiation outputs from a black body integrative wave guide according to this invention.

Referring now also to FIG. 4, traces 70, 72, 74, 76, 78, 80, 82, 84 and 86 represent a plot of the normalized radiation percentage output of the wave guide 40 across the spectrum of infrared wavelengths from 0.75 to 1.65 µm at various temperatures of 850° C., 800° C., 750° C., 700° C., 650° C., 625° C., 600° C., 550° C., and 500° C., respectively. The traces 70-86 are normalized with respect to the output trace 69 taken with the probe 40 exposed to a furnace temperature of 900° C. The graph in FIG. 4 does not change regardless of what portion of the sensor is inserted into the furnace 46 as long as the inequality that the length of the sensor 40 is much greater than $-d\tan\theta/(\ln(1-\epsilon))$ is met (assuming $\theta=45°$, the length of the sensor must be much greater than $-d/(\ln(1-\epsilon))$).

Figure 5:
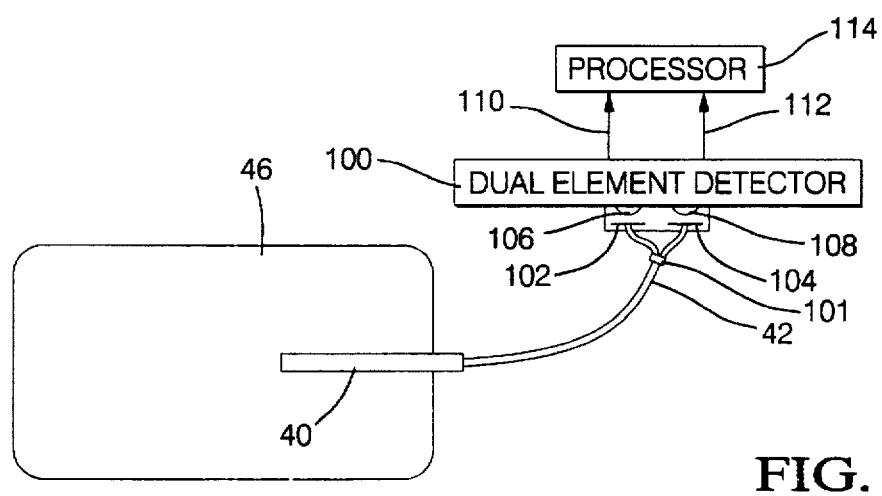
FIG. 5 illustrates an example temperature sensor apparatus according to this invention.

Referring to FIG. 5, the example temperature sensor apparatus shown provides a temperature output signal that is linearized and that has a decreased sensitivity to the background temperature of the sensing elements used to sense the emitted radiation. The black body integrative wave guide 40 is provided in an environment where the temperature is to be sensed. The black body integrative wave guide 40 emits electromagnetic radiation in response to the temperature of the environment and the optical fiber 42 carries the emitted radiation therefrom. The optical fiber 42 includes a beam splitter 101 of a known type and carries the emitted radiation to dual element sensor 100 having two different infrared-responsive detectors 106 and 108. Each detector 106, 108 includes an optical band pass filter 102, 104 so that sensing elements 106, 108 receive two different wavelengths of the black body radiation.

With the detectors 106 and 108 placed in close proximity to each other in the same sensing structure, the temperature of both sensors is validly assumed to be equal. It can be shown then that the difference between the two signals from the two detectors 106 and 108 is independent of the detector temperature. For example, the intensity of the wavelength signals are given by the following equations:

$$I(\lambda_1, T) = c \iint D(\lambda, T, \theta) F_1(\lambda) d\lambda d\theta - cT_{d1}^4, \quad \text{Equation 4}$$

$$I(\lambda_2, T) = c \iint D(\lambda, T, \theta) F_2(\lambda) d\lambda d\theta - cT_{d2}^4, \quad \text{Equation 5}$$

where $T_{d1}$ and $T_{d2}$ are the detector temperatures and c is a factor that depends on the detector geometry and responsiveness. If both detectors are identical, then c is identical in the two equations. If Equation 5 is subtracted from Equation 4, the portions of the equations representing the temperature of the detectors cancel out and thus a signal is provided independent of the temperature of the detectors 106 and 108.

In the preferred example, the detectors 106 and 108 are the two detectors of a dual element thermopile detector where each element is coated with an optical filter 102, 104. The first optical filter 102 has a center wavelength at 2.458 µm and a bandwidth of 233 nm and the second optical filter 104 has a wavelength at 1.578 µm and a bandwidth at 268 nm. These values provide a substantially linear response over a temperature range of 550° C. to 800° C. For any given implementation, the values for the center wavelengths of the band pass filters will vary depending on the material used as the blackbody radiator and based on the desired temperature range over which linear response is to be achieved. Such optical filters 102, 104 are well known to and easily implemented by one skilled in the art.

Lines 110 and 112 carry the signals representative of the intensity of the band pass filtered light reaching the detectors 106 and 108 and provide those signals to processor block 114, which may either be an analog circuit, a digital circuit or a microprocessor. Processor 114 receives the signals on lines 110 and 112, determines the difference between the two and provides an output corresponding to that difference, which output is a linearized response to the temperature of the medium 46 to which the sensor 40 is exposed.

Figure 6:
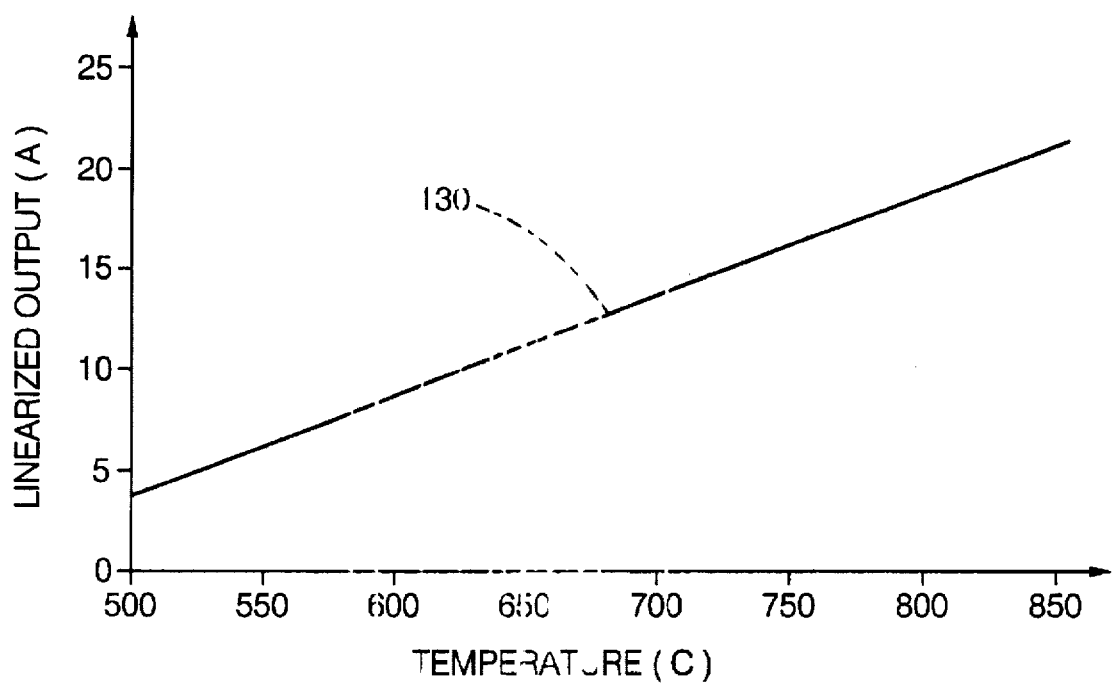
FIG. 6 illustrates an example linearized output of the example temperature sensor apparatus shown in FIG. 5.

FIG. 6 illustrates an example response of the temperature sensor arrangement of FIG. 5 over a range of 500°-800° C. As can be seen, trace 130 illustrates that the response is highly linear.

According to the above examples, a temperature sensor is disclosed herein that has the advantages of being well suited to a harsh environment, especially where the temperature is very high, such as in an internal combustion engine or an internal combustion engine exhaust stream. In the above examples, the black body integrative wave guide is described as comprising a hollow cylindrical tube of alumina.

Figure 7:
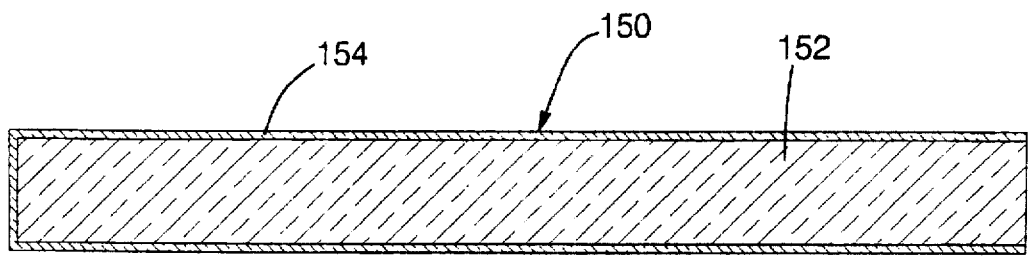
FIG. 7 illustrates an example wave guide according to this invention.

The same advantageous results may be obtained using other integrative wave guides, for example, wave guide 150 as shown in FIG. 7 comprising an optically transmissive core 152 (i.e., of quartz or fused silica) and a material of low emissivity for example fluorinated silica or platinum with emissivity 0.05 comprising a cladding 154 on the core, wherein the cladding 154 acts as the black body. The emissivity of a silica cladding 154 can be controlled by doping the cladding 154 with fluorine, germanium, boron, or any other impurity wherein the concentration of the doping determines the resultant emissivity.

We claim:

1. A temperature sensor comprising:
   a wave guide with a cylindrical wall;
   a material of low emissivity included at the cylindrical wall for generating black body radiation into the wave guide, wherein at least a portion of the generated black body radiation is carried through the wave guide;

a first sensor receiving the generated black body radiation and providing a first output signal indicative of a first magnitude of a first bandwidth of the generated black body radiation; and a second sensor receiving the generated black body radiation and providing a second output signal indicative of a second magnitude of a second bandwidth of the generated black body radiation, wherein a difference between the first and second output signals is a linearized indication of temperature of at least a portion of the wave guide.

2. A temperature sensor according to claim 1, wherein the wave guide comprises a hollow cylindrical tube comprising alumina and wherein the material of low emissivity comprises the alumina.

3. A temperature sensor according to claim 1, wherein the wave guide comprises an optically transmissive core and the material of low emissivity comprises a cladding on the core.

4. A temperature sensor according to claim 3, wherein the optically transmissive core comprises at least one of fused silica and quartz and wherein the cladding comprises silica doped with at least one member of a set comprising fluorine, germanium and boron.

5. A temperature sensor according to claim 1, wherein the wave guide has a diameter of d, an emissivity of s and a length of $x_o$, wherein $x_o$ is much larger than $-d/(\ln(1-\epsilon))$.

6. A temperature sensor according to claim 1, wherein the wave guide has an emissivity of less than 0.3.

7. A temperature sensor according to claim 1, wherein the wave guide has an emissivity of less than 0.2.

8. A temperature sensor according to claim 3, wherein the optically transmissive core comprises at least one of fused silica and quartz and wherein the cladding comprises platinum.

* * * * *